United States Patent Office 3,306,791
Patented Feb. 28, 1967

3,306,791

BONDING OF EPOXY RESINS TO POLYOLEFIN PLASTIC MATERIALS

John D. Nye, Gananoque, Ontario, Canada, assignor to Gulton Industries, Inc., Metuchen, N.J., a corporation of New Jersey No Drawing. Filed Oct. 8, 1962, Ser. No. 229,184
5 Claims. (Cl. 156—3)

This invention relates to the bonding of polyolefin plastic materials to epoxy resin materials. The resulting bonded materials have particular utility in the manufacture of electrical and electronic parts and components.

The high electrical resistivity and good dielectric characteristics of polyolefins such as the polyethylenes and polypropylenes, especially at high frequencies, coupled with their excellent moisture-, crack-, weir- and heat-resistant properties, in addition to their light weight and low cost, have made them important manufacturing materials in the electrical and electronics fields.

Workers in these and related fields have recognized the advantages to be gained by combining the desirable characteristics and properties of the polyethylenes and polypropylenes with standard electrical and electronic component fabrication materials like the epoxy resins. The epoxy resins, more commonly referred to as epoxies, have long occupied a position of importance in the electrical and electronics industries because of their demonstrated superior low dielectric loss properties, high insulation resistance, very low shrinkage, and mechanical strengths. Such production techniques as potting, encapsulation and embodiment utilizing epoxies permit more compact equipment designs, operation of electrical and electronic components in severe environments, and important weight and space savings, as well as reduction in production costs.

While the desirability of employing epoxy resin potting, encapsulation and embedment techniques in the fabrication of electrical and electronic components using polyethylene or polypropylene insulated parts has been appreciated, in practice, the results have been unsatisfactory because strong, long-lasting bonds between such polyolefins and the epoxy resins have not heretofore been attained. This, of course, has resulted in substantial shortening of the useful life of components manufactured in this manner.

It has heretofore been suggested that polyethylene may be treated in various ways, including oxidizing treatments, to modify its surface characteristics so as to render the polyethylene more receptive to printing inks and various adhesives and cements. However, bonds formed from such treated polyethylene and various adhesives are weak. In any event, so far as I am aware, the problem of providing strong and effective bonds between polyethylene or other polyolefins and epoxy resins, necessary in various applications, particularly for the production of electrical and electronic components, has not heretofore been solved.

In accordance with the present invention, I have discovered that if polyolefin plastic materials, particularly polyethylene and polypropylene plastic materials, are treated as hereafter described and are then bonded to epoxy resins, strong, intimate, substantially permanent bonds are obtained. This result is achieved without any apparent adverse effects on the highly desirable electrical characteristics and properties of the polyolefins, and with no appreciable increase in production costs.

The mechanics of carrying out my invention involve initially simply effecting an adequate contact, by immersion, spraying, or otherwise, between the polyolefin plastic material and a strong solution of an oxidizing acid containing a minor but effective amount of chromic acid, or a compound of chromium capable of in situ formation of chromic acid. Following such treatment, the polyolefinic plastic material desirably is further processed to remove substantially all of the acid solution therefrom. The material advantageously is then dried, after which it is bonded to the epoxy resin.

The highly advantageous results achieved in accordance with the practice of this invention are most desirably attained by utilizing, in conjunction with the chromic acid or chromic acid source material, concentrated sulfuric acid or fuming sulfuric acid, for example, 20% oleum, as the major component of the oxidizing acid solution. Desirably the concentration of the sulfuric acid should not be less than 90%, with concentrations of 95%, or more, being especially effective. Instead of using sulfuric acid, I have found that very satisfactory results are also attained with strong solutions of nitric acid, especially concentrated or fuming nitric acid. Solutions of this acid desirably should not contain less than 65% of the acid, usually 80%, or more. Mixtures of such strong oxidizing acids also may be used to advantage in achieving the objectives of the present invention.

As stated above, in conjunction with the sulfuric acid or nitric acid there is utilized a minor but effective amount of chromic acid, or a compound selected from the group consisting of chromium compounds capable of forming chromic acid in the presence of the oxidizing acid. Numerous compounds of chromium can be employed to achieve the desired conversion to chromic acid, exemplified by potassium chromate, potassium dichromate, potassium chromium chromate, potassium chromium sulfate, lithium chromate, lithium dichromate, sodium chromate, sodium di-chromate, and the like.

The quantity of chromic acid, or chromium compound, incorporated in the acid solution having utility for the purposes of this invention desirably ranges from about 0.05% to about 5.0%, or more, by weight. Generally speaking, the amount of the chromic acid, or chromic acid forming compound, utilized will be dependent upon the type and concentration of the oxidizing acid employed. For example, if the oxidizing acid solution contains sulfuric acid of the strengths indicated hereinabove, the quantity of chromic acid, or chromium compound, will, in most instances, range from about 0.05% to about 2%, by weight, with especially desirable results being obtained with from about 0.1% to about 1%, by weight, of either the acid or the compound. In those instances where nitric acid of the strengths specified is used in the oxidizing acid solution, the qauntity of the chromic acid, or the chromium compound, utilized will generally be from about 3% to 5%, or more.

While treatment of the polyolefin plastic materials in the acid solution can be satisfactorily carried out at room temperatures or below, elevated temperatures can be used. In this event, the concentration of the oxidizing acid may vary in accordance with the amount of heat applied to the acid solution, and it is, therefore, to be understood that concentrations ranging considerably below those indicated for the oxidizing acids can be utilized.

The length of time that the polyolefin plastic materials remain in contact with the acid solution will vary in accordance with the concentration of the acid components of the solution, and the temperature of the solution. At room temperature, and utilizing a concentrated (95%) sulfuric acid solution containing 1.0%, by weight of potassium chromate, for example, very satisfactory results can be obtained in a matter of minutes, of the order of five minutes, more or less.

Following treatment with the acid solution, the polyolefin plastic materials advantageously are further processed to remove substantially all traces of the acid solution therefrom. This may be accomplished, for example, by subjecting the treated material to a thorough washing in water, or, more desirably, by first contacting it with a suitable acid-neutralizing solution such as, for instance, a dilute solution of an alkali or base, such as sodium hydroxide, potassium hydroxide, or ammonium hydroxide, and thereafter washing with water. The neutralizing step substantially reduces processing time in that less water washing is required to remove the residual acid solution from the treated material. After the washing step the resulting treated polyolefin is dried, for instance in air or by subjection of the treated polyolefin to a current of heated air or by drying with chemicals such as acetone or alcohol.

The dried, treated polyolefin is bonded to the epoxy resin by any of various procedures per se known in the art. Thus, for instance, the epoxy resin is admixed with a hardener and said mixture is applied to the treated polyolefin surfaces and allowed to cure at room temperature or for shorter times at somewhat elevated temperatures, for instance up to about 80° C. or more but, in any event, at a temperature below that at which deformation of the polyolefin would occur. In general, higher curing temperatures can be used with polypropylenes than with polyethylenes so far as avoidance of deformation is concerned. Pressure may be used in the bonding operation between the treated polyolefin and the epoxy resin but is generally not required.

Numerous epoxy resins employed in the electrical and electronic industries and possessing adhesive or bonding properties can be used with advantage in fabricating components incorporating polyolefin plastic materials pretreated in the manner described above. Included in this group are such epoxies as those sold under the trade designations "Bakelite 2795," "Eccobond 51," "Scotchcast #8 and #212," and "Epon" types. These resins are adapted to have added thereto one or more additives, for instance, a hardening or curing agent, by way of example, amines such as diethylene triamine, or polyamides such as "Versamid 125," to accelerate curing. Reference may be made to U.S. Patent No. 2,705,223 which makes references to various curing agents which can be used with epoxy resins.

The pretreated polyolefins may be stored for periods of from two to three days or more before they are bonded to the epoxy resins with no apparent adverse effect on their capacity to form an intimate and long-lasting bond with epoxy resins.

Electrical components comprising polyolefins, particularly polyethylene or polypropylene, plastic materials, pretreated as described above and bonded to epoxy resins have been subjected to severe pressure cycling and low temperature tests with no apparent deterioration in the seals therebetween.

In order that those skilled in the art may even more fully understood the nature of my invention, I shall describe a few illustrative examples for carrying out the same. It will be understood, however, that the same are not to be construed in any way as limitative of the full scope of my invention, the latter being pointed out in the claims. It will also be understood that variations may be made in the concentration of the components of the oxidizing acid solution, the length of time of contact of the polyolefin plastic materials with the acid solution and the selection of the particular chromium compound. Those skilled in the art will, in the light of my teachings herein, be able to make various adjustments all of which will fall within the scope of my novel teachings.

*Example I*

A one foot length of tubing manufactured from a high density (0.95) polyethylene resin, sold under the trade designation "Marlex 5003," is immersed for 10 minutes at room temperature in a bath of 95% sulfuric acid containing 1.0%, by weight, of chromic acid. The tubing is then removed from the acid bath and immersed in a dilute solution of ammonium hydroxide for 30 seconds. The tubing is then washed with water and dried with acetone.

The thus treated tubing is placed upright in an open mouth glass mold of substantially greater diameter than the tubing, and a resin-curing agent system formed of 100 parts of an epoxy resin sold under the trade designation "Bakelite 2795" and 10 parts diethylene triamine is poured into the void between the inner wall of the glass mold and the outer wall of the treated tubing. The resin-curing agent system is allowed to cure at room temperature for 24 hours. An extremely strong bond results between the polyethylene and the epoxy resin.

*Example II*

A length of polyethylene tubing similar to that used in Example I is immersed in a bath of 65% nitric acid containing 5%, by weight, of chromic acid. The acid solution is heated at a temperature of 75° C. for 1 hour. The tubing is then removed from the bath and washed with water until there is no apparent trace of the acid solution thereon. It is then dried in warm air.

The thus treated tubing is bonded as in Example I to a resin-curing agent system formed of 100 parts of an epoxy resin sold under the trade designation "Bakelite 2795" and 12 parts of a curing agent sold under the trade designation "Versamid 125." The resin-curing agent system is cured in 45 minutes at a temperature of 50° C. A very strong bond is obtained between the treated polyethylene tubing and the epoxy resin.

*Example III*

A six inch length of tubing manufactured from a polypropylene resin having a density of about 0.9, and sold under the trade designation "Escon," is immersed for 5 minutes at room temperature in a bath of 95% sulfuric acid containing 1.0%, by weight, of chromic acid. The tubing is removed from the acid bath and washed thoroughly with water until no apparent trace of the acid solution remains on the tubing. The tubing is then air dried at a temperature of 40° C.

The treated tubing is bonded as in Example I to a resin-curing agent system formed of 100 parts of an epoxy resin sold under the trade designation "Epon 815" and 10 parts of piperidine. The resin-curing agent system is cured in 3 hours at a temperature of 100° C. The bond between the treated polypropylene and the epoxy resin is exceptionally strong.

What I claim as new and desire to be protected by Letters Patent is:

1. In a method of bonding a polyethylene plastic material to an epoxy resin, the steps comprising contacting a polyethylene plastic material with at least a 90% solution of sulfuric acid containing from about 0.05% to about 2%, by weight, of a compound selected from the group consisting of chromic acid and compounds of chromium capable of forming chromic acid in the presence of sulfuric acid, washing and drying the said treated polyethylene plastic material, and then applying an epoxy resin containing a curing agent to the dried material and allowing the said resin to cure on the material at room temperature.

2. In a method of bonding a polyolefin plastic material to an epoxy resin, the steps comprising contacting a polyolefin plastic material with a 95% solution of sulfuric acid containing from about 0.1% to about 1.0%, by weight, of a compound selected from the group consisting of chromic acid and compounds of chromium capable of forming chromic acid in the presence of sulfuric acid, washing the said treated polyolefin plastic material with an acid neutralizing solution and drying the washed material, and applying an epoxy resin containing a curing agent to the dried material and allowing the said resin to cure on the material at a temperature below that at which deformation of the polyolefin would occur.

3. In a method of bonding a polyolefin plastic material to an epoxy resin, the steps comprising contacting a polyolefin plastic material with at least a 65% solution of nitric acid containing from about 0.5% to about 5%, by weight, of a compound selected from the group consisting of chromic acid and compounds of chromium capable of forming chromic acid in the presence of the nitric acid, washing and drying the said treated polyolefin plastic material, and then applying an epoxy resin containing a curing agent to the dried material and allowing the said resin to cure on the material at room temperature.

4. In a method of bonding a polypropylene plastic material to an epoxy resin, the steps comprising contacting a polypropylene plastic material with at least a 90% solution of sulfuric acid containing from about 0.05% to about 2%, by weight, of a compound selected from the group consisting of chromic acid and compounds of chromium capable of forming chromic acid in the presence of sulfuric acid, washing the said treated polypropylene plastic material with an acid neutralizing solution and drying the washed material, and then applying an epoxy resin containing a curing agent to the dried material and allowing the said resin to cure on the material at room temperature.

5. In a method of bonding a polyethylene plastic material to an epoxy resin, the steps comprising contacting a polyethylene plastic material with at least a 65% solution of nitric acid containing from about 0.05% to about 5%, by weight, of chromic acid, washing the said treated polyethylene plastic material with an acid neutralizing solution and drying the washed material, and then applying an epoxy resin containing a curing agent to the dried material and allowing the said resin to cure on the material at room temperature.

References Cited by the Examiner

UNITED STATES PATENTS

| | | | |
|---|---|---|---|
| Re. 24,062 | 9/1955 | Horton | 117—47 X |
| 2,668,134 | 2/1954 | Horton | 156—316 |
| 2,886,471 | 5/1959 | Bruce et al. | 117—47 X |
| 2,928,948 | 3/1960 | Silversher | 250—108 |
| 3,022,192 | 2/1962 | Brandt | 156—307 X |
| 3,248,271 | 4/1966 | Rielly et al. | 156—2 |

EARL M. BERGERT, *Primary Examiner.*

HAROLD ANSHER, *Examiner.*